US012726889B1

(12) United States Patent
Chavez et al.

(10) Patent No.: US 12,726,889 B1
(45) Date of Patent: Sep. 1, 2026

(54) SELF-ORGANIZED BEAM MULTIPLEXING FOR AD HOC DIRECTIONAL MESH NETWORKING

(71) Applicant: Rockwell Collins, Inc., Cedar Rapids, IA (US)

(72) Inventors: Carlos J. Chavez, Marion, IA (US); Scott C. Bjornsen, Marion, IA (US); Benjamin J. Haan, Marion, IA (US); Joseph M. Kelly, Center Point, IA (US); Sasha N. Oster, Marion, IA (US); Daniel K Snodgrass, Palo, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 363 days.

(21) Appl. No.: 18/388,384

(22) Filed: Nov. 9, 2023

(51) Int. Cl.
*H04W 48/16* (2009.01)
*H04W 48/08* (2009.01)
*H04W 72/0446* (2023.01)

(52) U.S. Cl.
CPC ........... *H04W 48/16* (2013.01); *H04W 48/08* (2013.01); *H04W 72/0446* (2013.01)

(58) Field of Classification Search
CPC ..... H04W 16/30; H04W 48/08; H04W 48/16; H04W 56/001; H04W 72/0446; H04W 74/0816
See application file for complete search history.

(56) References Cited

U.S. PATENT DOCUMENTS

| | | | |
|---|---|---|---|
| 5,530,575 A | 6/1996 | Acampora et al. | |
| 11,683,259 B2 | 6/2023 | Ross et al. | |
| 2015/0382171 A1* | 12/2015 | Roy | H04Q 3/08 370/329 |
| 2017/0013572 A1* | 1/2017 | Jayaraman | H04W 56/001 |
| 2017/0374586 A1* | 12/2017 | Condeixa | H04B 17/318 |
| 2019/0320465 A1* | 10/2019 | Wu | H04W 74/0816 |
| 2019/0364453 A1* | 11/2019 | Sahin | H04W 16/30 |
| 2023/0067470 A1* | 3/2023 | Sun | H04L 1/0076 |

FOREIGN PATENT DOCUMENTS

WO 2008028362 A1 3/2008

* cited by examiner

*Primary Examiner* — Michael Thier
*Assistant Examiner* — Prince A Mensah
(74) *Attorney, Agent, or Firm* — Suiter Swantz IP

(57) ABSTRACT

A process for constructing a mesh network where nodes use time division multiplexing to define windows for directional communication between nodes in the network includes a discovery period during which node locations are established and the nodes define available windows of communication. Each node may then propose shared windows with other nodes for intermittent directional communication. Each node may include more than one antenna, or an electronically scanned array antenna with multiple apertures. Each window may define directional communication for multiple nodes during the window. Directional, time multiplexed communication enables spatially separated communication between multiple nodes during the same time window without interference.

20 Claims, 4 Drawing Sheets

SELF-ORGANIZED BEAM MULTIPLEXING FOR AD HOC DIRECTIONAL MESH NETWORKING

BACKGROUND

Directional apertures offer enhanced communication system performance, increasing range, data rate, spatial rejection of interference, and spatial control of emissions. Ad hoc directional mesh networking enables collaborative operations for SWAP-C (size, weight, power, and cost) constrained platforms in highly contested environments. This requires a self-organized directional media access scheme.

SUMMARY

In one aspect, embodiments of the inventive concepts disclosed herein are directed to a process for constructing a mesh network where nodes use time division multiplexing to define windows for directional communication between nodes in the network. During a discovery period, node locations are established and the nodes define available windows of communication. Each node may then propose shared windows with other nodes for intermittent directional communication.

In a further aspect, each node may include more than one antenna, or an electronically scanned array antenna with multiple apertures. Each window may define directional communication for multiple nodes during the window. Directional, time multiplexed communication enables spatially separated communication between multiple nodes during the same time window without interference.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
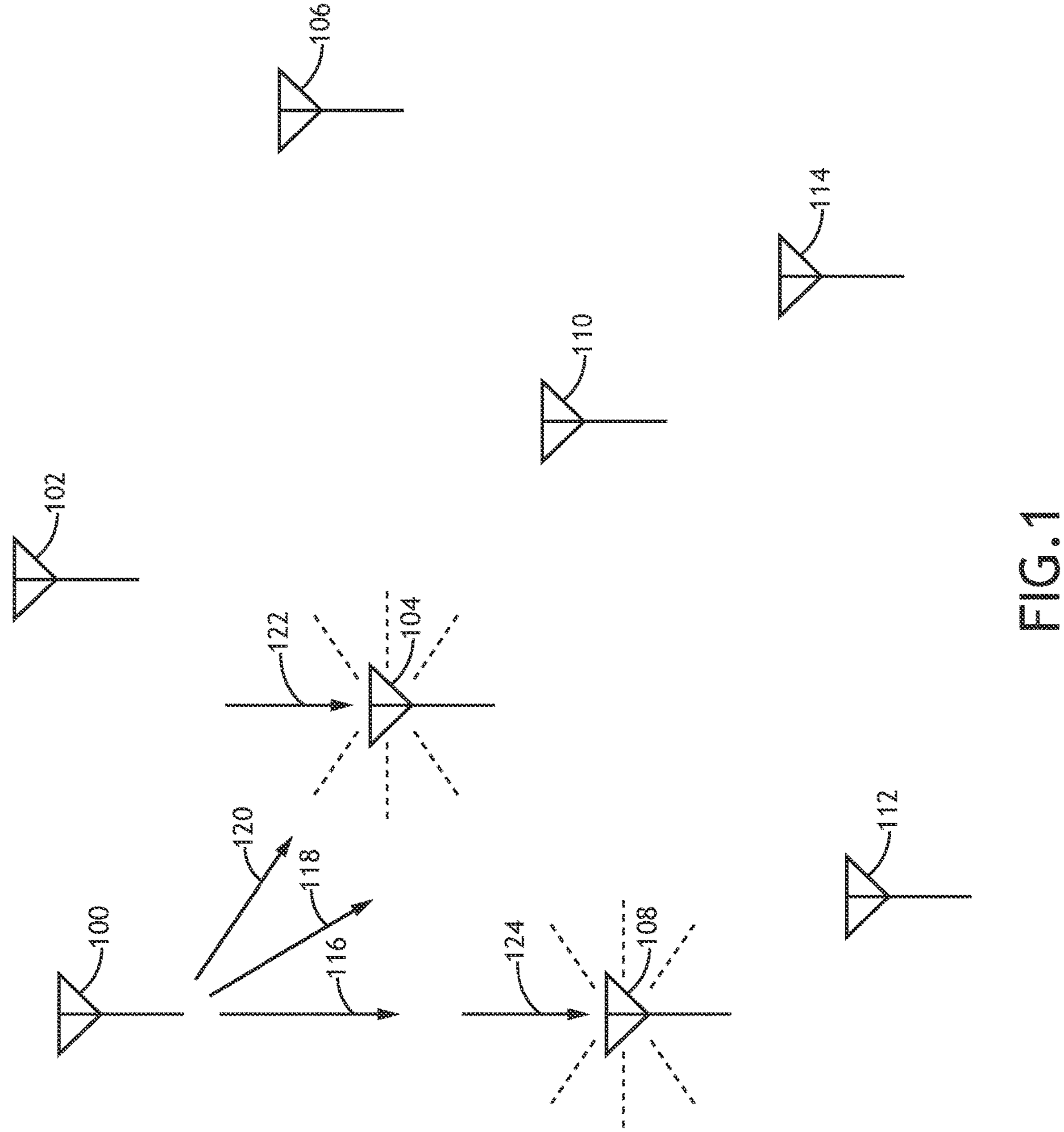
FIG. 1 shows a block diagram of a network according to an exemplary embodiment.

Before explaining various embodiments of the inventive concepts disclosed herein in detail, it is to be understood that the inventive concepts are not limited in their application to the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of a feature or element that may be similar, but not necessarily identical, to a previously described element or feature bearing the same reference numeral (e.g., 1, 1*a*, 1*b*). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Also, while various components may be depicted as being connected directly, direct connection is not a requirement. Components may be in data communication with intervening components that are not illustrated or described.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in at least one embodiment" in the specification does not necessarily refer to the same embodiment. Embodiments of the inventive concepts disclosed may include one or more of the features expressly described or inherently present herein, or any combination or sub-combination of two or more such features.

Broadly, embodiments of the inventive concepts disclosed herein are directed to a process for constructing a mesh network where nodes use time division multiplexing to define windows for directional communication between nodes in the network. During a discovery period, node locations (e.g., relative directions, at minimum) are established, and the nodes define available windows of communication. Each node may then propose shared windows with other nodes for intermittent directional communication. Each node may include more than one antenna, or an electronically scanned array antenna with multiple apertures. Each window may define directional communication for multiple nodes during the window. Directional, time multiplexed communication enables spatially separated communication between multiple nodes during the same time window without interference.

Referring to FIG. 1, a block diagram of a network according to an exemplary embodiment is shown. Directional discovery is the process by which nodes 100, 102,

104, 106, 108, 110, 112, 114 search for other nodes 100, 102, 104, 106, 108, 110, 112, 114 in order to form communication links while retaining the benefits of directive apertures for both transmission and reception. In at least one embodiment, nodes 100, 102, 104, 106, 108, 110, 112, 114 in the network utilize discovery periods, agreed upon by all nodes 100, 102, 104, 106, 108, 110, 112, 114, to search for other nodes 100, 102, 104, 106, 108, 110, 112, 114. The length and frequency of these discovery periods are chosen to achieve a desired balance between discovery speed and media access capacity. Discovery periods may be randomized in time for transmission security.

For each discovery period, each node 100, 102, 104, 106, 108, 110, 112, 114 may randomly determine its transmit/receive state. Transmitters 100 may randomly choose an angle 116 (per simultaneous beam) to send a discovery message, then choose another angle 118, 120 and repeat for the length of the discovery period. Receivers 104, 108 may randomly choose a single angle 122, 124 (for each of multiple simultaneous beams) to search during the entire discovery period. This approach minimizes the time spent emitting continuously in any one direction, minimizes propagation guard time, and does not require any coordination of search patterns between transmitter 100 and receiver 104, 108.

During discovery (potentially including multiple discovery periods), each node 100, 102, 104, 106, 108, 110, 112, 114 identifies its neighbors, including the directionality of each neighbor based on the angles 116, 118, 120, 122, 124.

Figure 2:
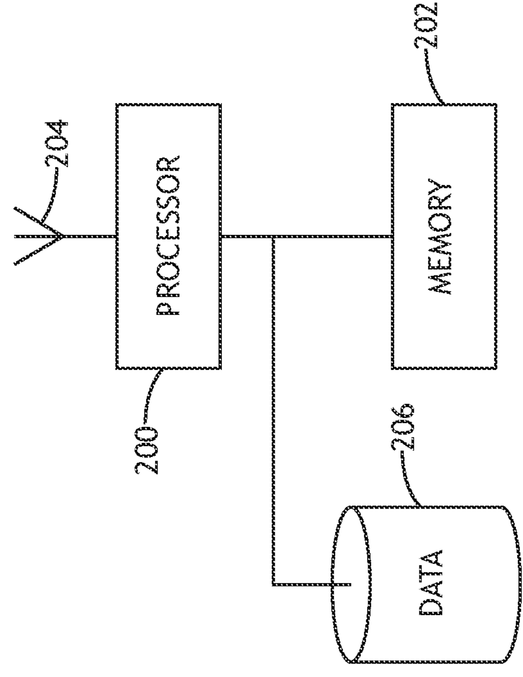
FIG. 2 shows a block diagram of a system suitable for implementing embodiments of the present disclosure.

Referring to FIG. 2, a block diagram of a system suitable for implementing embodiments of the present disclosure is shown. The system, embodied in a node in a mesh network, includes a processor 200, memory 202 connected to the processor 200 for embodying processor executable code, and at least one antenna 204 connected to the processor 200. The processor is configured to communicate with other nodes in the network according to a schedule, either predefined or defined via communication between the nodes.

The processor 200 defines discrete windows of communication, the windows including discovery windows and slot pair communication windows. Discovery windows are generally coordinated among all nodes. Slot pair communication windows may be defined at similar times among the nodes, but the slot pair communication windows are not identical among nodes as described herein.

During the discover process, each processor 200 may randomly or periodically operate as a transmitter or receiver. The processor 200 configures the at least one antenna 204 for directional communication, either according to some predefined pattern, or randomly. Where the processor 200 configures the antenna 204 as a transmitter, the processor 200 may periodically alter the directionality of the antenna 204 during the discovery process. Where the processor 200 configures the antenna 204 as a receiver, the processor 200 may maintain the directionality of the antenna 204 during the entire discovery process.

In at least one embodiment, where the processor 200 identifies neighboring nodes, either the processor 200 or the neighboring node processor may identify an unpopulated slot pair window specific to that node, and send a message proposing to include the neighboring node in that unpopulated slot pair window. The neighboring node may then accept or reject the proposed inclusion. If the proposed inclusion is accepted, the unpopulated slot pair becomes populated, including the directionality of the neighboring node, and is not available for other neighboring nodes, and the populated slot pair window is stored in a data storage element 206. Self-organized beam multiplexing allows multiple nodes to transmit during the same time slot without coordination. Spatial reuse is enabled by the spatial isolation provided by directional apertures.

In at least one embodiment, the processor 200 may be further configured to configure or otherwise modulate signals according to a spread spectrum or other frequency division technique. Further isolation may be provided by spread spectrum techniques and/or frequency division.

In at least one embodiment, the at least one antenna 204 may include a plurality of antennas 204 or a single electronically scanned array antenna 204 that may be configured with multiple directional apertures. In such embodiments, each slot pair window may define as many openings as the number of antennas of directional apertures. Neighbors could use multiple slot pairs in order to increase capacity between those neighbors.

Figure 3:
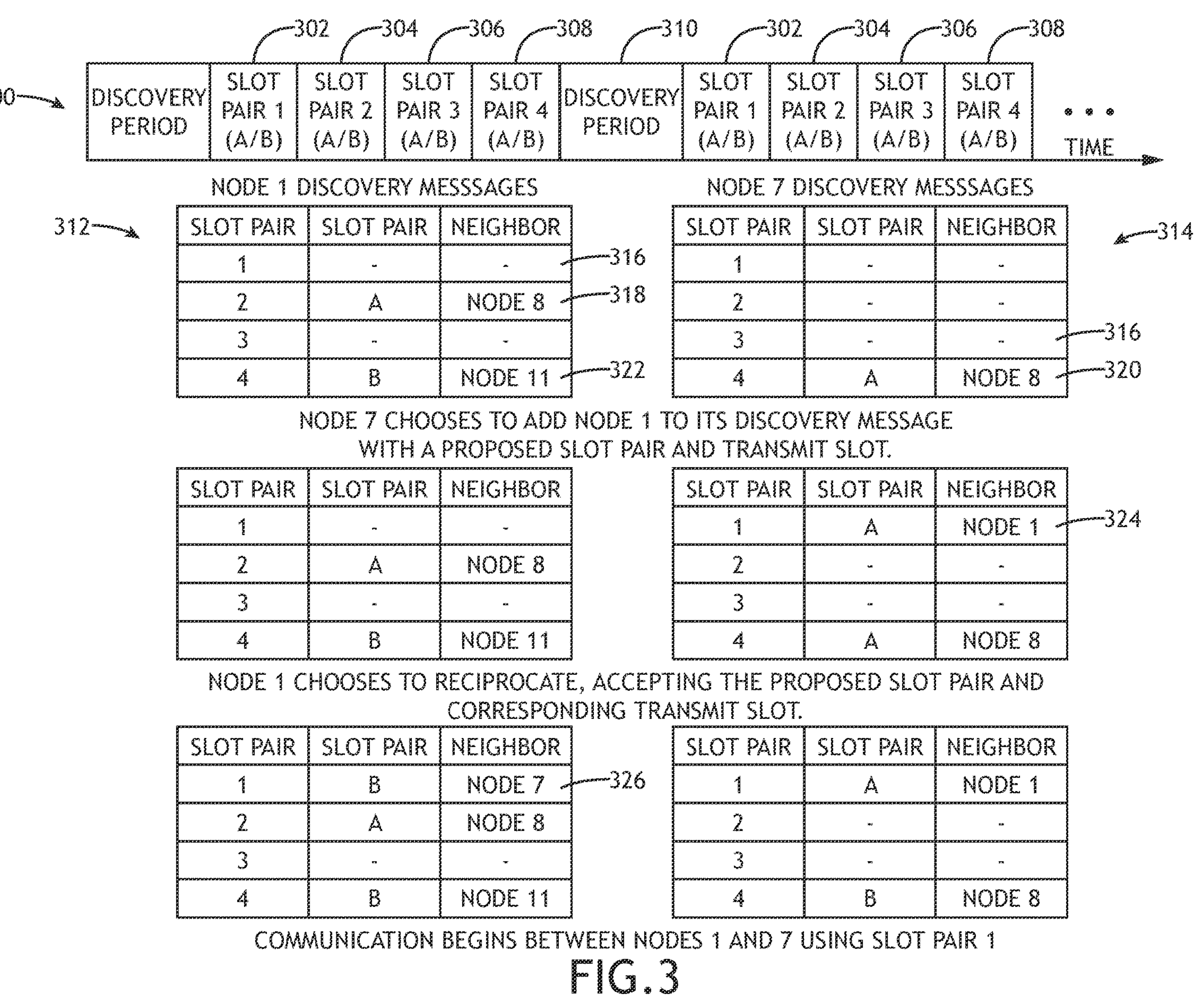
FIG. 3 shows a block diagram of time windows and node paring.

Referring to FIG. 3, a block diagram of time windows and node paring is shown. Self-organized beam multiplexing divides the TDMA structure 300 into pairs of multiplexing time slots 302, 304, 306, 308 to be used for two-way links between pairs of neighbor nodes. The TDMA structure 300 may be randomized in time for transmission security. The maximum number of neighbors (per beam) for each node may be defined by the number of assignable time slots 302, 304, 306, 308.

In at least one embodiment, the length of the time slots 302, 304, 306, 308 may be chosen to achieve a desired balance between latency and media access capacity due to propagation guard time. Multiple time slots 302, 304, 306, 308 may be used by a single pair of neighbor nodes; a node may thereby have fewer neighbors with more capacity per neighbor.

In at least one embodiment, each node transmits discovery messages 312, 314 advertising available slot pairs 316 and existing neighbors occupying slot pairs 318, 320, 322. A node may choose to add a candidate neighbor to its discovery message with a proposed slot pair 324, including transmit/receive assignment within the pair. If the candidate neighbor receives the discovery message, it may choose to reciprocate by populating the slot pair 326. The nodes may then begin two-way, directional communication via the chosen slot pair 324, 326.

Self-organized beam multiplexing supports nodes that operate with multiple beams. Populated slot pairs 326, 324 constrain the transmit/receive state for that node for additional neighbor relationships using the same slot pair and additional beams as the apertures on a node must share a common transmit/receive state in order to avoid interference between transmission and reception on the same node. Each populated slot pair 326, 324 is associated with a directionality defined by the neighbor node.

Figure 4:
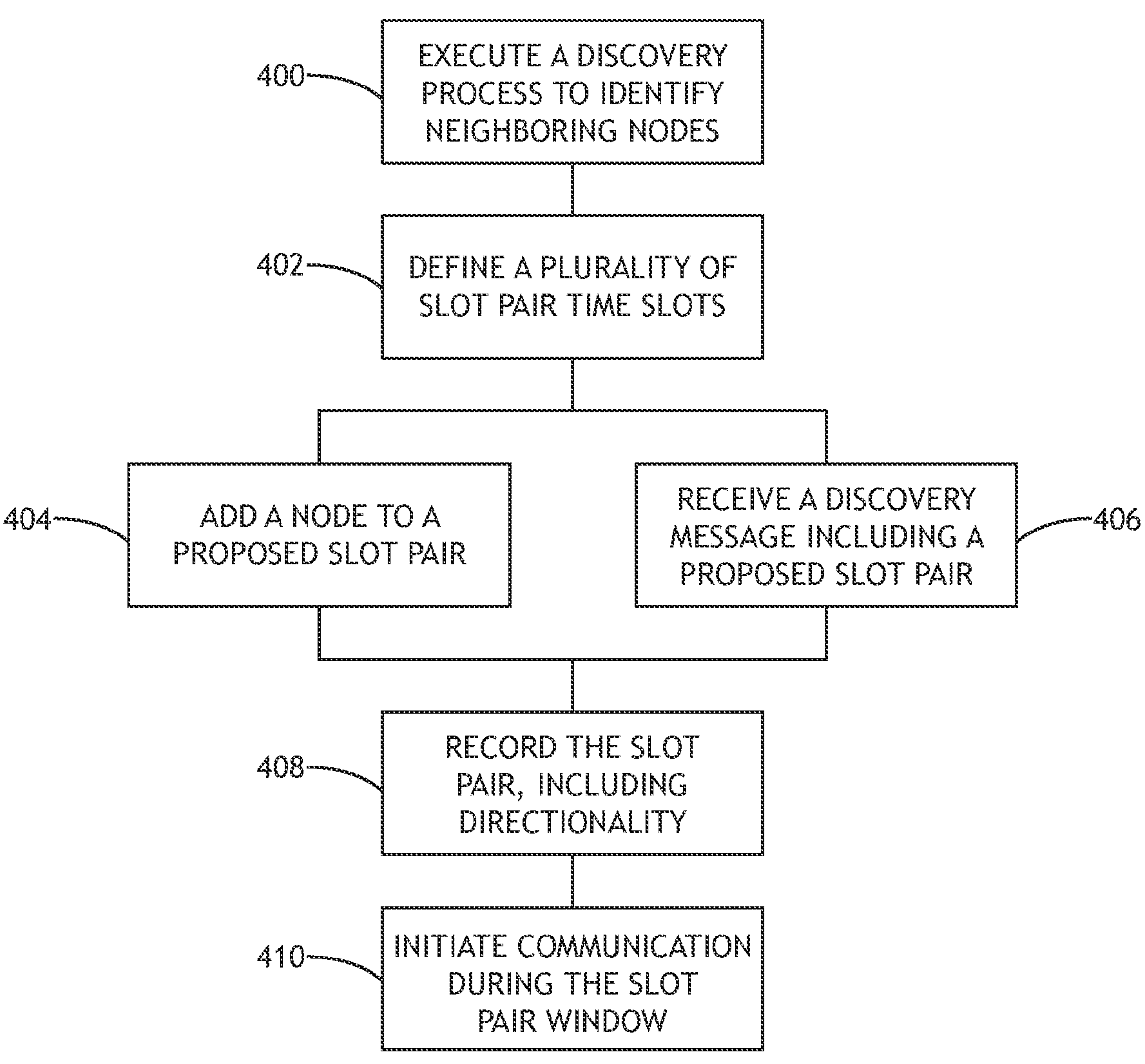
FIG. 4 shows a flowchart of a method for maintaining directional connectivity in a mesh network according to an exemplary embodiment.

Referring to FIG. 4, a flowchart of a method for maintaining directional connectivity in a mesh network according to an exemplary embodiment is shown. Each node of a mesh network executes 400 a discovery process to identify each neighboring node, including a direction of the node.

In at least one embodiment, the nodes define 402 a plurality of slot pair windows for two-way directional communication. Furthermore, the nodes may define discovery windows to facilitate simultaneous discovery and definition of coordinated slot pairs.

During a discovery process, each node may, in a transmit mode, transmit directional messages including unpopulated slop pair windows (an advertisement message). When the nodes determine that a neighboring node is in a certain direction, the node may add 404 the node to an unpopulated slot pair and transmit a message indicating a desire to add the neighboring node to the unpopulated slot pair.

In a receive mode, the node that receives 406 the message indicating the desire to add the neighboring node to the unpopulated slot pair may determine that the proposed slot pair is also unpopulated for the receiving node. In either case, the nodes may agree to populate the proposed slot pair and record 408 the slot pair including directionality for the associated neighboring node.

During each communication window, nodes in each slot pair configure their corresponding antennas to initiate 410 directional communication with the corresponding neighboring nodes (including multiple neighboring nodes where the node includes multiple antennas or a single electronically scanned array antenna that may be configured with multiple apertures.

Each one of those slot pairs has an A and B slot in it. Logically, they could be randomly scrambled up, but that structure may also repeat. That is the information that is advertised in the discovery messages. The node may add the candidate neighbor to a free slot in his own discovery message and send it out.

In at least one embodiment, a node could list multiple neighbors for a time slot. The node could list a primary neighbor in that time slot and others opportunistically but not publicly advertised in the discovery messages.

Embodiments of the present disclosure enable a technique for self-organized beam multiplexing in ad-hoc directional mesh networks. A form of time-division multiple access (TDMA) determines transmitter/receiver pairing and scheduling for half-duplex directional communication links. The scheme requires only low-overhead, local, and distributed coordination among nodes; does not require centralized scheduling or network infrastructure (e.g., base stations or control nodes); accommodates directional apertures; enables spatial reuse to improve network capacity; maintains direct physical-layer connectivity with multiple neighboring nodes; and constrains the number of direct neighbors to enable scaling as the number of nodes increases.

Embodiments of self-organized beam multiplexing scales as network size increases. The number of simultaneous one-way links is a function of the number of nodes in the network. These embodiments take advantage of the spatial isolation provided by directional apertures.

It is believed that the inventive concepts disclosed herein and many of their attendant advantages will be understood by the foregoing description of embodiments of the inventive concepts, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The forms herein before described being merely explanatory embodiments thereof, it is the intention of the following claims to encompass and include such changes. Furthermore, any of the features disclosed in relation to any of the individual embodiments may be incorporated into any other embodiment.

What is claimed is:

1. A computer apparatus comprising:
- at least one antenna; and
- at least one processor in data communication with a memory storing processor executable code for configuring the at least one processor to:
  - define a plurality of time windows, including at least one discovery window and two or more slot pair windows, each slot pair window comprising a paired transmit slot and receive slot defining a bidirectional communication opportunity;
  - transmit one or more directional discovery messages during the discovery window;
  - identify a neighboring node;
  - identify an unpopulated slot pair based on a locally maintained record of populated slot pairs;
  - transmit the unpopulated slot pair to the neighboring node as a proposed slot pair assignment;
  - receive an acceptance of the proposed slot pair from the neighboring node prior to population of the slot pair;
  - populate the unpopulated slot pair with the neighboring node and associate with the direction-of-arrival from the neighboring node, storing direction-of-arrival information; and
  - configure the at least one antenna for directional communication with the neighboring node during the populated slot pair window using the associated direction-of-arrival information.

2. The computer apparatus of claim 1, wherein the at least one processor is further configured to:
- receive one or more directional discovery messages during the discovery window;
- receive an unpopulated slot pair proposal message from an alternate neighboring node;
- determine that a corresponding local slot pair window is unpopulated; and
- populate the local slot pair window with the alternate neighboring node and associate with the direction-of-arrival from the alternate neighboring node.

3. The computer apparatus of claim 1, wherein the at least one processor is further configured to:
- receive one or more directional discovery messages during the discovery window;
- receive an unpopulated slot pair proposal message from an alternate neighboring node;
- determine that a corresponding local slot pair window is populated;
- identify an alternative, unpopulated slot pair window; and
- transmit the alternative unpopulated slot pair window to the alternate neighboring node.

4. The computer apparatus of claim 1, wherein:
- the at least one antenna comprises at least two antennas;
- each slot pair window defines a number of slot pairs corresponding to the at least two antennas; and
- the at least one processor is further configured to:
  - configure the at least two antennas to communicate with separate neighboring nodes during each slot pair window.

5. The computer apparatus of claim 1, wherein:
- the at least one antenna comprises an electronically scanned array;
- each slot pair window defines a number of slot pairs corresponding to a number of apertures definable by the at least one antenna; and
- the at least one processor is further configured to:
  - configure the at least one antenna to communicate with separate neighboring nodes during each slot pair window.

6. The computer apparatus of claim 1, wherein the at least one processor is further configured to:
- identify a plurality of unpopulated slot pairs in two or more slot pair windows;
- transmit the plurality of unpopulated slot pairs to the neighboring node;

populate two or more of the unpopulated slot pairs with the neighboring node and neighboring node directionality; and configure the at least one antenna for directional communication with the neighboring node during each of the populated slot pair windows.

7. The computer apparatus of claim 1, wherein the at least one processor is further configured to:

determine that the neighboring node has left communication range;

identify any slot pair windows including the neighboring node; and depopulate the neighboring node from each of the identified slot pair windows.

8. A method for establishing directional communication in a mesh network comprising:

defining a plurality of time windows, including at least one discovery window and two or more slot pair windows, each slot pair window comprising a paired transmit slot and receive slot defining a bidirectional communication opportunity;

transmitting one or more directional discovery messages during the discovery window;

identifying a neighboring node;

identifying an unpopulated slot pair based on a locally maintained record of populated slot pairs;

transmitting the unpopulated slot pair to the neighboring node as a proposed slot pair assignment;

receiving an acceptance of the proposed slot pair from the neighboring node prior to population of the slot pair;

populating the unpopulated slot pair with the neighboring node and neighboring node directionality, storing direction-of-arrival information; and configuring at least one antenna for directional communication with the neighboring node during the populated slot pair window using the associated direction-of-arrival information.

9. The method of claim 8, further comprising:

receiving one or more directional discovery messages during the discovery window;

receiving an unpopulated slot pair proposal message from an alternate neighboring node;

determining that a corresponding local slot pair window is unpopulated; and populating the local slot pair window with the alternate neighboring node and alternate neighboring node directionality.

10. The method of claim 8, further comprising:

receiving one or more directional discovery messages during the discovery window;

receiving an unpopulated slot pair proposal message from an alternate neighboring node;

determining that a corresponding local slot pair window is populated;

identifying an alternative, unpopulated slot pair window; and transmitting the alternative unpopulated slot pair window to the alternate neighboring node.

11. The method of claim 8, wherein:

each slot pair window defines a number of slot pairs corresponding to a number of antennas; and configuring the at least one antenna for directional communication comprises configuring the at least one antenna to communicate with separate neighboring nodes during each slot pair window.

12. The method of claim 8, wherein:

each slot pair window defines a number of slot pairs corresponding to a number of apertures definable by the at least one antenna; and configuring the at least one antenna for directional communication comprises configuring the at least one antenna to communicate with separate neighboring nodes during each slot pair window.

13. The method of claim 8, further comprising:

identifying a plurality of unpopulated slot pairs in two or more slot pair windows;

transmitting the plurality of unpopulated slot pairs to the neighboring node;

populating two or more of the unpopulated slot pairs with the neighboring node and neighboring node directionality; and configuring the at least one antenna for directional communication with the neighboring node during each of the populated slot pair windows.

14. A mesh network system comprising:

a plurality of nodes, each node comprising:

at least one antenna; and at least one processor in data communication with a memory storing processor executable code for configuring the at least one processor to:

define a plurality of time windows, including at least one discovery window and two or more slot pair windows, each slot pair window comprising a paired transmit slot and receive slot defining a bidirectional communication opportunity;

transmit one or more directional discovery messages during the discovery window;

identify a neighboring node;

identify an unpopulated slot pair based on a locally maintained record of populated slot pairs;

transmit the unpopulated slot pair to the neighboring node as a proposed slot pair assignment;

receive an acceptance of the proposed slot pair from the neighboring node prior to population of the slot pair;

populate the unpopulated slot pair with the neighboring node and neighboring node directionality; and configure the at least one antenna for directional communication with the neighboring node during the populated slot pair window using the associated directionality.

15. The mesh network system of claim 14, wherein the at least one processor is further configured to:

receive one or more directional discovery messages during the discovery window;

receive an unpopulated slot pair proposal message from an alternate neighboring node;

determine that a corresponding local slot pair window is unpopulated; and populate the local slot pair window with the alternate neighboring node and alternate neighboring node directionality.

16. The mesh network system of claim 14, wherein the at least one processor is further configured to:

receive one or more directional discovery messages during the discovery window;

receive an unpopulated slot pair proposal message from an alternate neighboring node;

determine that a corresponding local slot pair window is populated;

identify an alternative, unpopulated slot pair window; and transmit the alternative unpopulated slot pair window to the alternate neighboring node.

17. The mesh network system of claim 14, wherein:

the at least one antenna comprises at least two antennas;

each slot pair window defines a number of slot pairs corresponding to the at least two antennas; and the at least one processor is further configured to:

configure the at least two antennas to communicate with separate neighboring nodes during each slot pair window.

18. The mesh network system of claim 14, wherein:

the at least one antenna comprises an electronically scanned array;

each slot pair window defines a number of slot pairs corresponding to a number of apertures definable by the at least one antenna; and the at least one processor is further configured to:

configure the at least one antenna to communicate with separate neighboring nodes during each slot pair window.

19. The mesh network system of claim 14, wherein the at least one processor is further configured to:

identify a plurality of unpopulated slot pairs in two or more slot pair windows;

transmit the plurality of unpopulated slot pairs to the neighboring node;

populate two or more of the unpopulated slot pairs with the neighboring node and neighboring node directionality; and configure the at least one antenna for directional communication with the neighboring node during each of the populated slot pair windows.

20. The mesh network system of claim 14, wherein the at least one processor is further configured to:

determine that the neighboring node has left communication range;

identify any slot pair windows including the neighboring node; and depopulate the neighboring node from each of the identified slot pair windows.

* * * * *